Dec. 29, 1953 J. S. RUSSO 2,664,510
FREQUENCY MULTIPLIER CIRCUIT
Filed Oct. 12, 1950
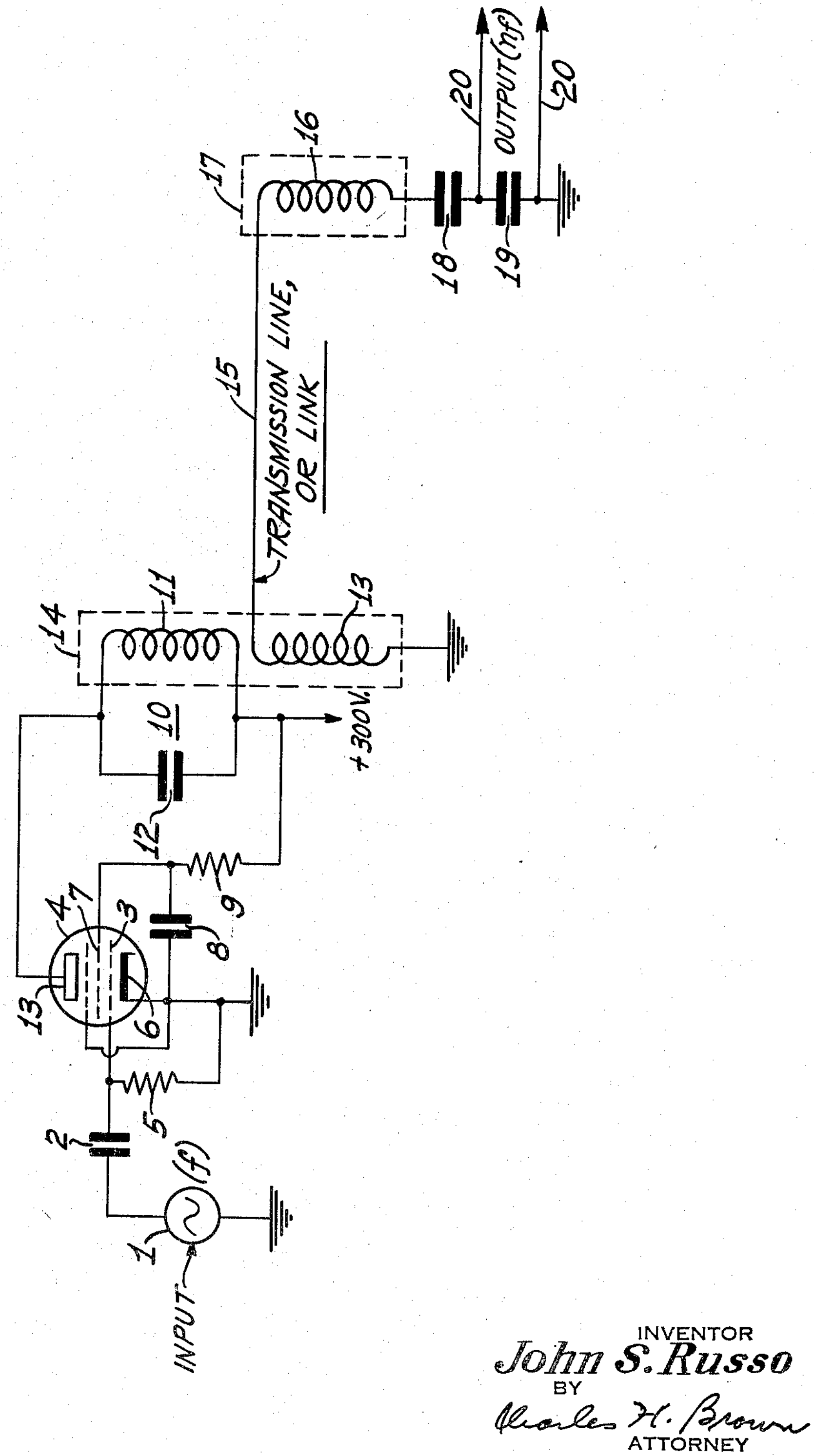
INVENTOR
John S. Russo
BY
Charles H. Brown
ATTORNEY Patented Dec. 29, 1953

2,664,510

UNITED STATES PATENT OFFICE 2,664,510

FREQUENCY MULTIPLIER CIRCUIT

John S. Russo, Philadelphia, Pa., assignor to Radio Corporation of America, a corporation of Delaware Application October 12, 1950, Serial No. 189,728

4 Claims. (Cl. 250—36)

This invention relates to a frequency multiplier circuit, and more particularly to a circuit for producing a frequency which is a given multiple or harmonic of a fundamental input frequency.

An object of this invention is to devise a frequency multiplier which has particular utility at frequencies in the low radio frequency range.

Another object is to devise a frequency multiplier which has very high selectivity for the desired harmonic frequency.

A further object is to provide a frequency multiplier circuit which has extreme flexibility of loading.

An additional object is to provide a frequency multiplier of small physical size, which small size is of importance in portable equipment.

The foregoing and other objects of the invention will be best understood from the following description of an exemplification thereof, reference being had to the accompanying drawing whose single figure diagrammatically represents a frequency multiplier circuit according to this invention.

The objects of this invention are accomplished, briefly, in the following manner: A parallel inductance-capacitance (LC) resonant circuit, tuned to the desired harmonic, is shock-excited by the fundamental frequency. A small coil is inductively coupled to the coil of this circuit, and is connected by means of a transmission line to a series LC circuit tuned to the desired harmonic, from which series circuit output of harmonic frequency may be taken, via a capacitive voltage divider if desired.

Referring to the drawing, a source of fundamental input frequency 1 having a frequency $f$ is coupled through a condenser 2 to the control grid 3 of a pentode vacuum tube 4, for example of the 6AC7 or 6AG5 type. A resistor 5 is connected between grid 3 and grounded cathode 6 of tube 4. The capacitance-resistance combination 2, 5 provides a self-biasing arrangement for tube 4, establishing a class C bias on this tube such that only the positive peaks of the input voltage from source 1 get through to the anode or output circuit of this tube. The screen grid 7 of tube 4 is bypassed to ground by condenser 8 and is connected through a resistor 9 to the positive terminal of a source of unidirectional potential.

A parallel resonant LC circuit 10, consisting of an inductance or coil 11 and a capacitor 12, is connected in the output circuit of tube 4, between anode 13 thereof and a source of positive potential. Circuit 10 is tuned to the desired harmonic of the input frequency $f$, for example, to $5f$ or $6f$. As a typical example, although this invention is not to be considered limited in any way thereby, the frequency $f$ may be 93.109 kc. In this case, then, circuit 10 may be tuned to approximately 465 kc. or to approximately 558 kc., depending on whether the fifth or sixth harmonic is desired. Application of the fundamental frequency $f$ to grid 3 provides shock excitation in the circuit 10, thus providing harmonic frequency voltage in coil 11. The Q of circuit 10 is made high to reduce as much as possible the damping of the harmonic frequency voltage between cycles of the input fundamental frequency.

The circuit of this invention has particular application to harmonic frequencies in the low radio frequency range, such as those given by way of example above, on the order of 500 kc. At frequencies of this order of magnitude, rather large inductances are required at 11 for proper tuning of circuit 10 to the harmonic frequency. If the coil 11 is to have high Q, this means that such coil will ordinarily consist of only a few turns of wire on a core having a large amount of iron. Conventionally, frequency multipliers having high selectivity for the desired harmonic frequency require double tuned circuits, or, in other words, require that the coil of another tuned circuit (tuned to the desired harmonic frequency) be coupled to coil 11 of tuned circuit 10. Such a coil to be inductively coupled to coil 11 must also have a large inductance, if its tuned circuit is to be tuned to a harmonic frequency on the order of 500 kc., for example. Also, to be efficient in operation, such a coil to be coupled to coil 11 would have to have a high Q. It is extremely difficult to couple directly two coils of large inductance, and it is particularly so if these coils are both of high Q, which means in the present circuit a few turns of wire on a rather large iron core. According to the present invention, double tuned circuits, requiring large inductances when used in the low radio frequency range, are rendered unnecessary. Coils having large inductances can be used in this invention, without worrying about the difficulties of coupling two such coils to each other. Also, by the present invention, coupling to the parallel resonant shock-excited circuit 10 can be effected without considering the problems of directly coupling two high-Q coils.

The flux developed in coil 11 links a coil 13, which is inductively coupled thereto. Coils 11 and 13 may be enclosed in the same casing or shell, indicated by the dotted rectangle 14. Coil 13 does not need to have a high Q, nor does it need to have a high value of inductance. Therefore, it can be very easily and simply coupled to coil 11, and may in fact consist of merely a few turns of wire wound on the same core as is coil 11. The coupling between coils 11 and 13 may be adjusted to be as tight or as loose as desired.

One end of coil 13 is grounded as indicated and its opposite end is connected by means of a transmission line or link 15 to one end of a coil 16. Line 15 may be any suitable form of line, such as an open wire line or a coaxial transmission line, the latter being preferable if it is desired to reduce radiation from the line. The inductances of coils 16 and 11 are both large compared to that of coil 13, and coil 16 is designed to have a very high Q. Coil 16 may be mounted inside a casing or shell, indicated by the dotted rectangle 17.

The other end of coil 16 is connected through a capacitive voltage divider, consisting of two series-connected capacitors 18 and 19, to ground. Therefore, the harmonic frequency voltage developed across coil 13 is applied to the series circuit 16, 18, 19. The series LC circuit 16, 18, 19 is tuned to the desired harmonic frequency, this circuit being therefore a harmonically-tuned series resonant circuit. Output of harmonic frequency *nf*, where *n* is the desired multiplication factor, may be taken from across capacitor 19 by means of a pair of leads 20 connected thereacross.

In addition to providing a capacitive voltage divider, the combination of capacitors 18 and 19 serves another useful purpose. The capacitance of 19 may be large compared to that of 18. Therefore, variations in the capacity of a tube, to which leads 20 might be connected, have an almost negligible effect on the frequency to which circuit 16, 18, 19 is tuned, since they have an almost negligible effect on the resultant or total capacitance of the two series-connected capacitors 18 and 19.

The voltage across the series combination of the two capacitors 18 and 19 will be approximately equal to the voltage across coil 13 multiplied by the Q of coil 16. Since both of these factors can be, and preferably are, quite high, high output voltage at the desired harmonic frequency *nf* will be delivered by leads 20. This output voltage will be free from appreciable modulation of the exciting voltage of frequency *f*, due in part to the fact that the coils 11 and 16 each have high Q.

The series resonant circuit 16, 18, 19 has a low impedance at the harmonic frequency, since it is tuned to such frequency. The choice of the impedance of transmission line 15 is the factor which determines the length of such line. Ordinarily, the impedance of transmission line 15 matches the resonant impedance of circuit 16, 18, 19, which is quite low at the harmonic frequency. Conditions of mismatch, at low frequency, cause the line 15 to act as a shunt capacitance. This has the effect of detuning the 16, 18, 19 circuit. However, this detuning can be compensated for by an adjustment of inductance 16; therefore, the link 15 connecting 13 and 16 may be of considerable length, if desired. The fact that the link 15 may be of considerable length, enables extreme flexibility of loading of the arrangement of this invention. In other words, the load may be separated a considerable distance from the main part of the circuit, including tube 4 and circuit 10.

Since coils 11 and 16 may each have high inductance and high Q, the circuit of this invention has particular utility at frequencies in the low radio frequency range. Due to the use of two resonant circuits, to wit, the parallel resonant circuit 10 and the series resonant circuit 16, 18, 19, both tuned to the harmonic frequency, high selectivity is provided for the desired harmonic frequency. The entire arrangement is of small physical size, due in part to the fact that the high-Q coils 11 and 16 do not need to be directly coupled together; such direct coupling would necessarily increase the physical size of the system.

What is claimed is:

1. A frequency multiplier circuit comprising a parallel resonant circuit narrowly tuned to the single desired output frequency, means for shock exciting said circuit with a frequency which is a sub-multiple of said output frequency, a coil coupled inductively to said circuit, a resonant circuit narrowly tuned to said single output frequency, output connections coupled to said last-named resonant circuit, and means for connecting said last-named resonant circuit across said coil through connections devoid of concentrated impedance.

2. A frequency multiplier circuit comprising a parallel resonant circuit narrowly tuned to the single desired output frequency, means for shock exciting said circuit with a frequency which is a sub-multiple of said output frequency, a coil coupled inductively to said circuit, a series resonant circuit narrowly tuned to said single output frequency, output connections coupled to said series circuit, and means for connecting said series circuit across said coil through connections devoid of concentrated impedance.

3. A frequency multiplier circuit comprising a resonant circuit narrowly tuned to the single desired output frequency, means for shock exciting said circuit with a frequency which is a sub-multiple of said output frequency, a coil coupled inductively to said circuit, a series inductance-capacitance resonant circuit narrowly tuned to said single output frequency, the capacitance of said series circuit comprising a plurality of capacitors constituting a voltage divider, an output circuit coupled across a portion of said divider, and means for connecting said series circuit across said coil through connections devoid of concentrated impedance.

4. A frequency multiplier circuit in accordance with claim 3, wherein the portion of the divider across which the output circuit is coupled includes a capacitor having a capacitance which is large compared to the capacitance of the remaining ones of the plurality of capacitors.

JOHN S. RUSSO.

References Cited in the file of this patent

UNITED STATES PATENTS

| Number | Name | Date |
|---|---|---|
| 1,646,439 | Affel | Oct. 25, 1927 |
| 2,266,668 | Tubbs | Dec. 16, 1941 |
| 2,368,780 | Roberts | Feb. 6, 1945 |
| 2,484,763 | Sturm | Oct. 11, 1949 |